(12) United States Patent
Nguyen et al.

(10) Patent No.: US 6,480,376 B1
(45) Date of Patent: Nov. 12, 2002

(54) ELEVATIONALLY ADJUSTABLE PORTABLE COMPUTER DOCKING STATION

(75) Inventors: Minh H. Nguyen, Katy; John E. Youens, Magnolia, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/551,693

(22) Filed: Apr. 18, 2000

(51) Int. Cl.[7] ................................................. G06F 1/16
(52) U.S. Cl. ..................... 361/686; 361/755; 312/223.1; 364/708.1; 16/329
(58) Field of Search ................................. 361/679–686, 361/724–727, 730, 752, 755, 796, 825, 829, 759; 312/223.1, 223.2, 351.1–351.9; 364/708.1; 16/324, 326, 329, 330, 334, 341, 342; 74/530; 403/93–94, 97, 106; 320/15, 2, 6; 248/127, 128, 447, 466, 479, 917–923, 664, 676, 465, 456

(56) References Cited

U.S. PATENT DOCUMENTS 5,436,792 A * 7/1995 Leman et al. ............... 361/686
D366,468 S * 1/1996 Ryan et al. .................. D14/100
5,627,450 A * 5/1997 Ryan et al. .................... 320/15
5,633,782 A * 5/1997 Goodman et al. ........... 361/683
5,822,185 A * 10/1998 Cavello ....................... 361/686
6,185,096 B1 * 2/2001 Helot et al. .................. 361/686

FOREIGN PATENT DOCUMENTS

JP   410292896 A * 11/1998 ........... F16M/11/12

* cited by examiner

*Primary Examiner*—Darren Schuberg
*Assistant Examiner*—Michael Datskovsky (57) ABSTRACT

A portable computer docking station housing is provided on its bottom side with a support foot structure which is pivotable relative to the housing to prop it up on a horizontal work station surface in a selectively variable one of a series of different front-to-rear tilt angles thereon. This permits the opened display screen of a docked portable computer disposed on the top side of the docking station housing to be selectively adjusted upwardly and downwardly in a vertical plane to accommodate the height and viewing preferences of a user of the docked computer. A specially designed spring-loaded, manually operable clutch mechanism is useable to releasably lock the support foot in its selected pivotal orientation relative to the housing. Various peripheral device connection ports are conveniently incorporated in the support foot.

24 Claims, 9 Drawing Sheets

ELEVATIONALLY ADJUSTABLE PORTABLE COMPUTER DOCKING STATION

BACKGROUND OF THE INVENTION

1. Field of the invention

The present invention generally relates to computer apparatus and, in a preferred embodiment thereof, more particularly relates to a docking station mateable with a portable computer and operative to couple it to desktop peripheral devices such as a keyboard, mouse and monitor.

2. Description of Related Art

In computer parlance a "docking station" is an interface device to which a portable computer, such as the increasingly popular notebook computer, may be operatively and removably coupled to connect its central processing unit and other internal circuitry to desktop computer peripheral devices such as a keyboard, monitor, printer and mouse. In this manner the portable computer may be used "on the road" by its owner, utilizing its own keyboard, monitor and pointing device, and later used in a home or office desktop work station in conjunction with the larger desktop peripheral devices which are typically considered to be more comfortable to use over extended periods of work time. Thus, a single computer can provide its user with both the compactness, light weight, portability and diminutive work space requirements of the notebook computer and the power and comfort of a desktop system with its larger workspace and peripheral devices.

A conventionally configured docking station typically comprises a housing adapted to sit atop the desktop work space and containing the interface electronics used to connect the "docked" portable computer to the desktop peripheral devices operatively coupled to the docking station. The housing has a generally horizontal top side surface upon which the portable computer is rested, keyboard side up, before being rearwardly moved relative to the housing to removably couple a connector on the rear side of the computer to a corresponding docking connector on the docking station housing.

While docked portable computers have conventionally been utilized in conjunction with larger desktop computer monitors, the display image on portable computer continues to be provided with increasing size and sharpness. Accordingly, increasing numbers of owners are foregoing the use of desktop computer monitors with their docked portable computer and simply using the built-in display of the docked portable computer. This, of course, substantially reduces the amount of desktop work space that must be dedicated to the docked portable computer.

Due to the small viewing area of the typical notebook computer display screen compared to that of a desktop monitor, however, a viewing comfort penalty is still paid by using the portable computer display screen. This viewing comfort penalty arises primarily because of the lack of an ability to adjust the vertical location of the display screen of a docked portable computer to accommodate users of varying heights. Since the top side of a conventional docking station remains in a fixed vertical location relative to the desktop surface, the only vertical orientation adjustment capability of the display screen of the docked portable computer resides in the ability to pivot the display screen toward and away from the user. While this affords a limited height adjustment for the docked portable computer display screen, such minimal height adjustment cannot be achieved without correspondingly varying the angle of the display plane relative to the user's line of sight.

In view of the foregoing it can readily be seen that a need exists for a docking station that provides improved display screen height adjustability for a portable computer operatively supported on the docking station. It is to this need that the present invention is directed.

SUMMARY OF THE INVENTION

In carrying out principles of the present invention, in accordance with a preferred embodiment thereof, a specially designed docking station is provided for use in operatively coupling a portable computer to a desktop computer peripheral device, the portable computer having a first electrical docking connector. The docking station includes a housing having a wall portion upon which the portable computer may be placed, the housing being restable on a horizontal support surface such as a desktop work surface. A second electrical docking connector is carried by the housing and is releasably mateable with the first electrical docking connector.

According to a key aspect of the invention, the docking station is provided with a tilt adjustment structure carried by its housing and being operative to selectively adjust the angle between the wall portion and the horizontal support surface when the housing is placed thereon. The ability to adjustably tilt the docking station housing on the underlying support surface substantially reduces the vertical footprint on the support surface of the docking station/portable computer assembly, and desirably provides the ability of adjusting the vertical height of the computer's display screen, to accommodate users of varying heights, when it is being used instead of a desktop computer monitor operatively coupled to the docking station and thus to the docked portable computer.

From a broad perspective, the tilt adjustment structure includes a support member associated with the housing for movement relative thereto among a series of different positions and being engageable with the horizontal support surface, and a locking structure operable to releasably lock the support member in a selectively variable one of its series of different positions.

Preferably, the support member is a support foot member pivotally carried on an underside portion of the docking station housing for pivotal motion relative thereto about an axis generally parallel to the rear side of the housing and forwardly spaced therefrom approximately one third of the distance between the front and rear sides of the housing. The locking structure is illustratively a spring-loaded clutch structure selectively engageable with a portion of the support foot member and rotatably supporting it on the docking station housing. The spring-loaded clutch structure representatively has a lever portion squeezable against the housing to temporarily disengage the clutch structure from the support member and permit it to freely rotate relative to the housing until releasably locked again relative to the housing by the clutch structure.

To operatively couple desktop computer peripheral devices to the docking station, and thus to the portable computer docked thereon, electrical interface circuitry is coupled to the second electrical docking connector, and at least one connection port is coupled to the electrical interface circuitry and is electrically connectable to a desktop computer peripheral device. Preferably this connection port is carried by the support foot member.

Representatively, the pivotal support foot member is releasably lockable in (1) a first pivotal limit position thereof to engage the horizontal support surface in a manner tilting the wall portion at an angle of approximately ten degrees relative to the horizontal support surface, and (2) a second pivotal limit position thereof to engage the horizontal support surface in a manner tilting the wall portion at an angle of approximately 60 degrees relative to the horizontal support surface. Additionally, the support foot member is releasably lockable by the clutch structure at approximately twenty degree pivotal increments between the first and second pivotal limit positions of the support foot member.

In a preferred embodiment of the docking station, the support foot member has spaced apart first series of clutch teeth thereon, and the clutch system includes first and second opposed clutch members carried by the housing for movement toward and away from one another and having second series of clutch teeth thereon which oppose the first series of clutch teeth. Spring structures resiliently bias the first and second clutch members toward one another to positions in which the second series of clutch teeth are lockingly intermeshed with the first series of clutch teeth. The aforementioned lever portion of the clutch system include a pair of pivotal lever members with outer end portions projecting outwardly from the housing. These outer lever end portions may be manually squeezed against adjacent portions of the housing to cause the lever members to drive the first and second clutch members away from one another to temporarily disengage the second series of clutch teeth from the first series of clutch teeth and thereby unlock the support foot member from the clutch system.

DETAILED DESCRIPTION

Figure 1:
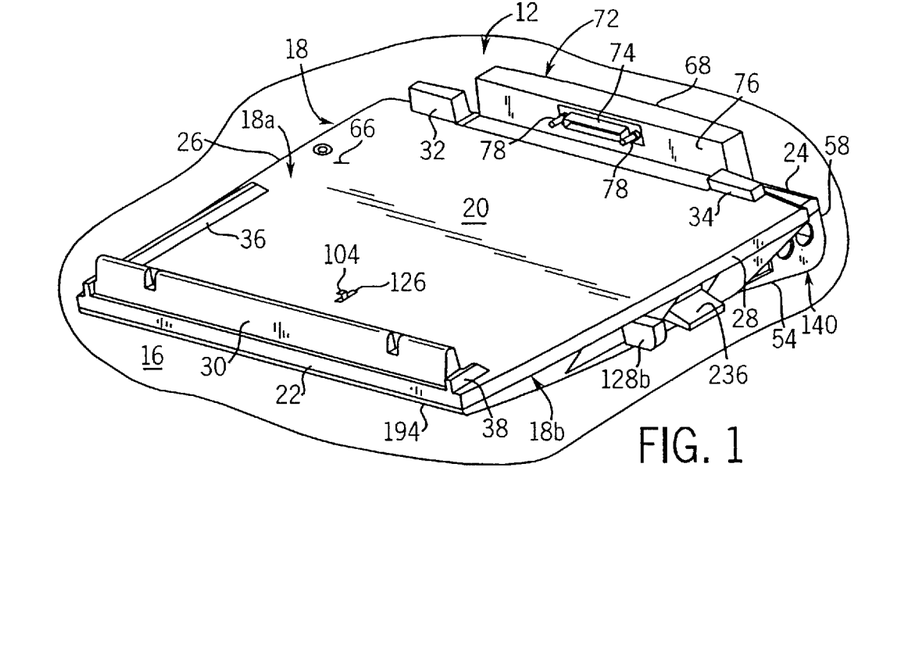
FIG. 1 is a perspective view of a portable computer docking station embodying principles of the present invention, the docking station being in a pivotally lowered orientation.

Perspectively illustrated in FIG. 1 is a specially designed docking station 12 which embodies principles of the present invention and is operative to electrically couple a portable notebook computer 14 (see FIG. 2) to desktop peripheral devices (not shown) such as a keyboard, monitor, mouse and printer. The docking station 12 is restable on a horizontal support surface, such as the illustrated desktop 16, and includes a generally rectangular hollow housing 18 having separable upper and lower sections 18a and 18b. Upper housing section 18a has a top side 20, opposite front and rear side edge portions 22 and 24, and opposite left and right side edge portions 26 and 28.

Various restraining ribs project upwardly from these side edge portions, including a front restraining rib 30 projecting upwardly from the front side edge portion 22 and longitudinally extending along nearly its entire length, a pair of rear restraining ribs 32,34 projecting upwardly from the rear side edge portion 24 and spaced apart along its length, a left restraining rib 36 projecting upwardly from a front part of the left side edge portion 26, and a right restraining rib 38 projecting upwardly from a front part of the left side edge portion 28.

Figure 2:
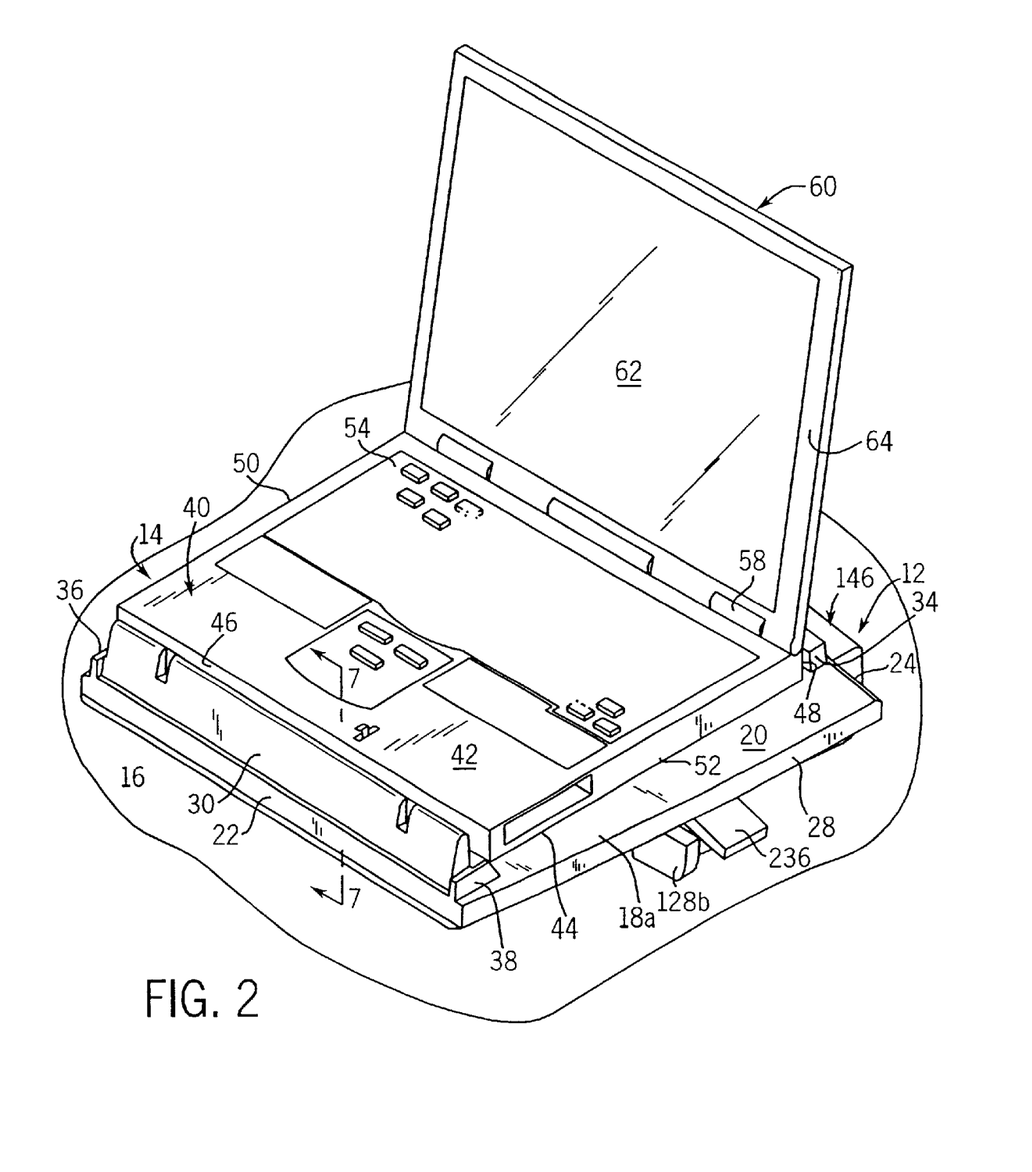
FIG. 2 is a perspective view of the docking station of FIG. 1 with a portable computer operatively docked thereto.
Figure 3:
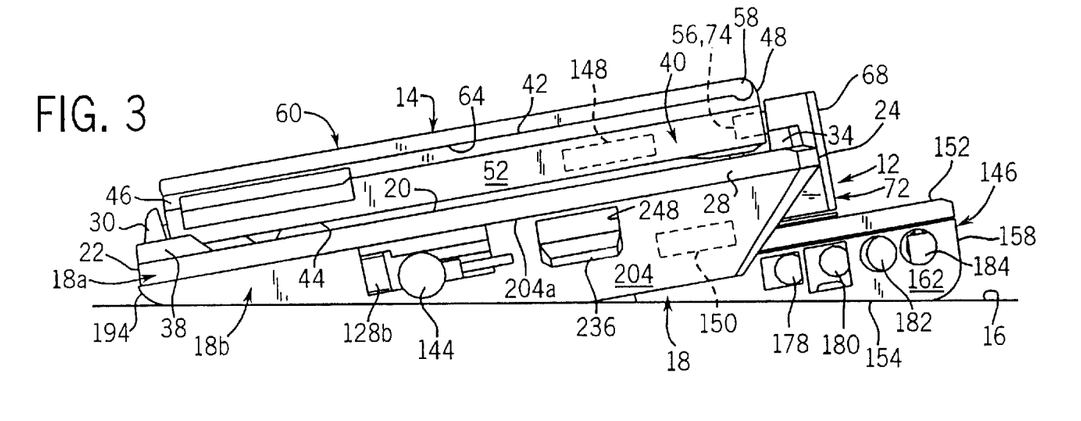
FIG. 3 is an enlarged scale right side elevational view of the docking station and portable computer shown in FIG. 2.

As illustrated in FIGS. 2 and 3, the notebook computer 14 has a rectangular base housing 40 with top and bottom sides 42 and 44, opposite front and rear sides 46 and 48, and opposite left and right ends 50 and 52. A keyboard 54 is operatively mounted on the top base housing side 42 (see FIG. 2), and an electrical docking connector socket 56 (see FIG. 3A) is recessed into a central portion of the rear side 48. A hinge mechanism 58 located on a top rear corner portion of the computer base housing 40 secures a thinner rectangular lid housing 60 to the base housing. Lid housing 60 has a rectangular display screen 62 on its front or inner side 64.

The lid housing 60 is pivotable relative to the base housing 40 between an opened use position (shown in FIG. 2) in which the lid housing 60 is generally vertically oriented with the display screen 62 facing the user of the computer, and a closed storage and transport orientation (shown in FIG. 3) in which the lid housing 60 is swung downwardly to extend along and cover the top base housing side 42. A suitable latch mechanism (not shown) is operable to releasably retain the lid housing 60 in its closed position.

The inner side surfaces of the docking station retaining ribs 30,32,34,36,38 peripherally bound a rectangular receiving and holding area 66 disposed on the top side 20 of the upper docking station section 18a (see FIG. 1) and configured to complementarily receive the notebook computer base housing 40 when the notebook computer 14 is placed on the top side 20 prior to operatively coupling the computer 14 to the docking station 12 in a manner later described herein. When the notebook computer 14 is placed in the receiving and holding area 66 (see FIG. 2), the horizontally inner side surfaces of the ribs 30,32,34,36,38 define abutment surfaces that face corresponding side surfaces of the base housing 40 and preclude appreciable movement of the received computer 14 relative to the docking station 12 parallel to its top side 20.

Figure 3A:
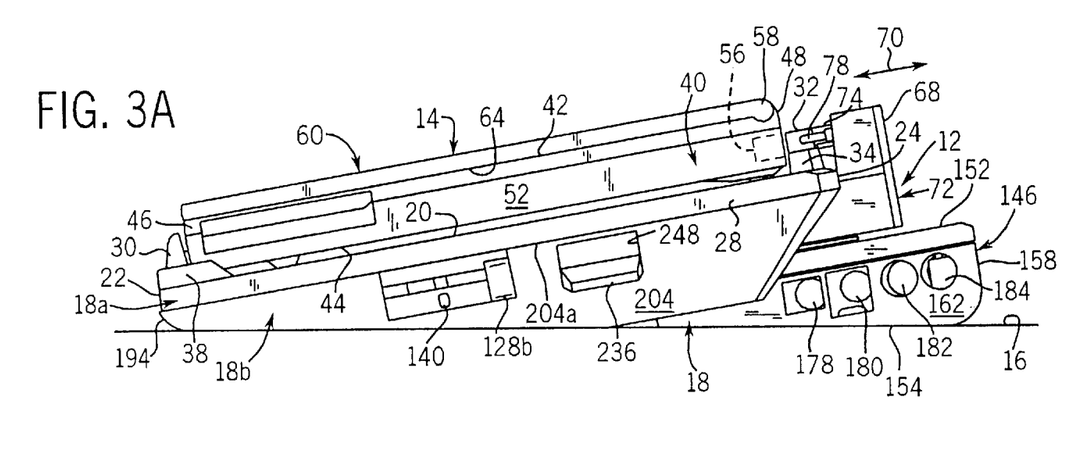
FIG. 3A is a view similar to that in FIG. 3, but with a movable docking connector portion of the docking station being rearwardly shifted out of engagement with the stationary portable computer.

With the received notebook computer 14 firmly restrained in this manner against horizontal front-to-rear and side-to-side movement relative to the docking station 12, the computer may be "docked" to the station 12 using a docking connector body 68 (see FIGS. 1, 3 and 3A) which, according to a feature of the present invention, projects upwardly past the docking station rear side edge portion 24 and is movable toward and away from the rear side 48 of the stationary base housing 40 in a front-to-rear direction as indicated by the double-ended arrow 70 in FIG. 3A.

Referring now to FIGS. 1 and 4–6, the connector body 68 forms a portion of a specially designed movable docking connector structure 72 which includes a multi-pin electrical plug connector 74 projecting forwardly from a front upper side portion 76 of the connector body 68 and being flanked on its opposite ends by a pair of forwardly projecting guide pin members 78. Also projecting forwardly from the connector body 68, just below the connector 74, is a slide plate structure 80 (see FIG. 5) having opposite left and right side edges 82,84 and a forwardly projecting central front tab portion 86 having an oblong slot 88 formed in an outer end portion thereof.

An elongated rectangular security latch plate member 90 (see FIG. 6) is associated with the slide plate structure 80 as later described herein, and has front and rear ends 92 and 94, a front end notch 96 having opposite left and right side edges 98 and 100 and at the rear end of which a latch projection 102 upwardly extends and has a forwardly extending hook portion 104 on its upper end, a rectangular rear end opening 106 having front and rear edges 108 and 110, and a longitudinally central opening 112 having opposite left and right side edges 114,116.

Figure 4:
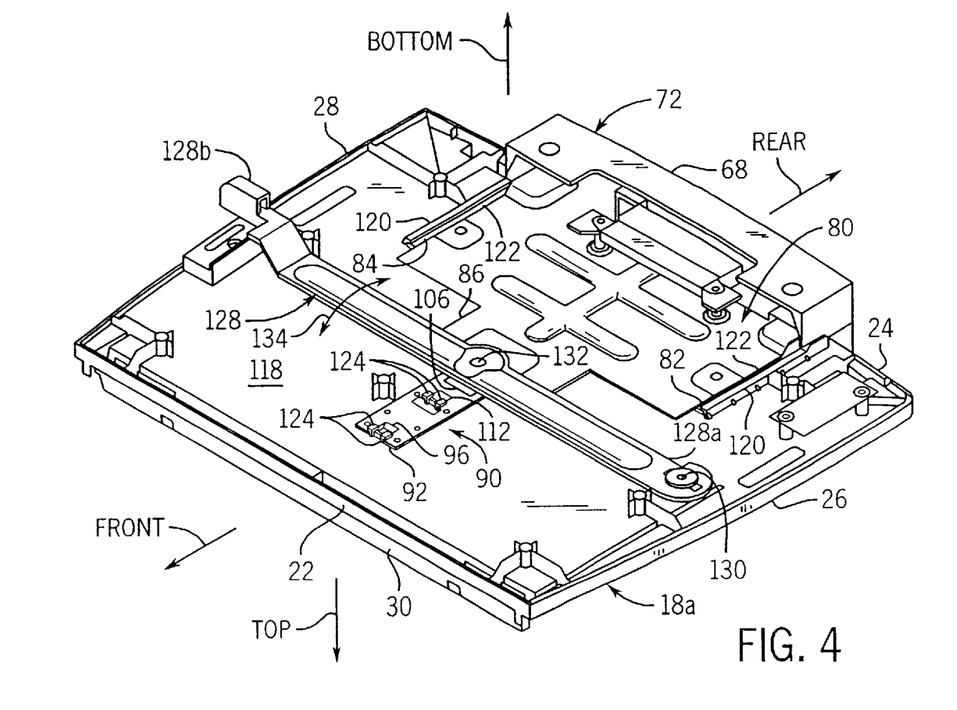
FIG. 4 is an enlarged scale bottom side perspective view of a top side portion of the docking station removed from the balance of the docking station and illustrating the structure and operation of the movable docking connector portion of the docking station.
Figure 5:
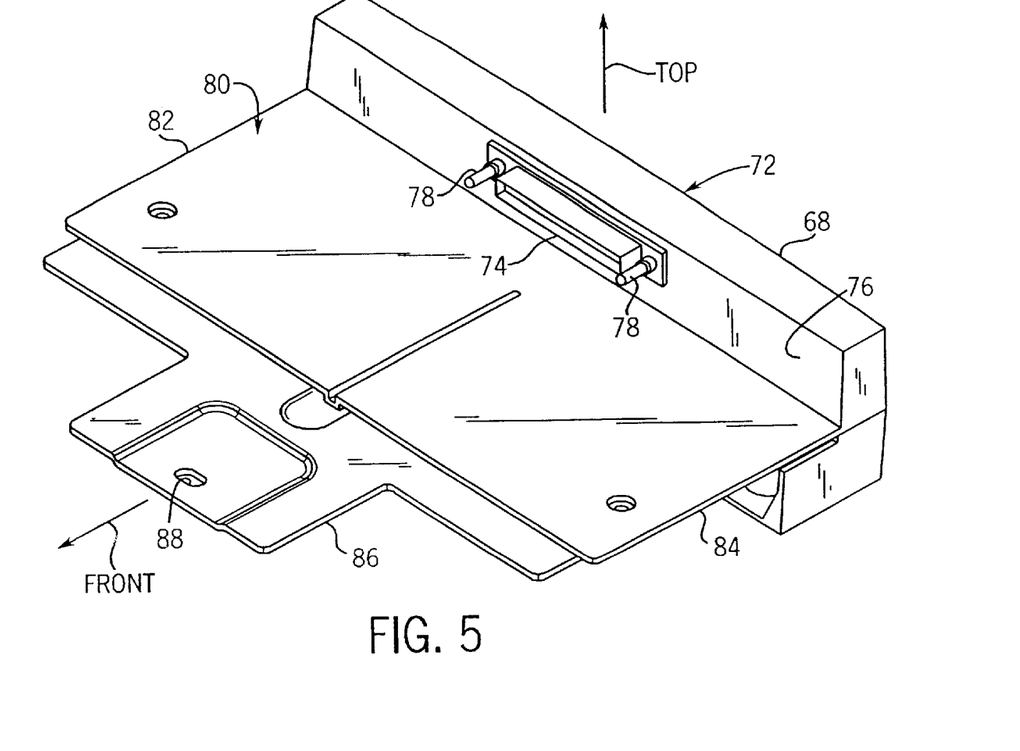
FIG. 5 is an enlarged scale top side perspective view of the movable docking connector portion.

Turning now to FIG. 4, which perspectively illustrates the bottom side 118 of the upper section 18a of the docking station housing 18, the slide plate structure 80 extends along the bottom side 118 and is slidably supported thereon, for forward and rearward movement relative thereto, by a parallel pair of elongated brackets 120 formed on the bottom side 118, spaced apart in a left-to-right direction, and longitudinally extending in front-to-rear directions. Brackets 120 define elongated grooves 122 that slidably receive the opposite left and right side edges 82,84 of the slide plate structure 80.

Figure 6:
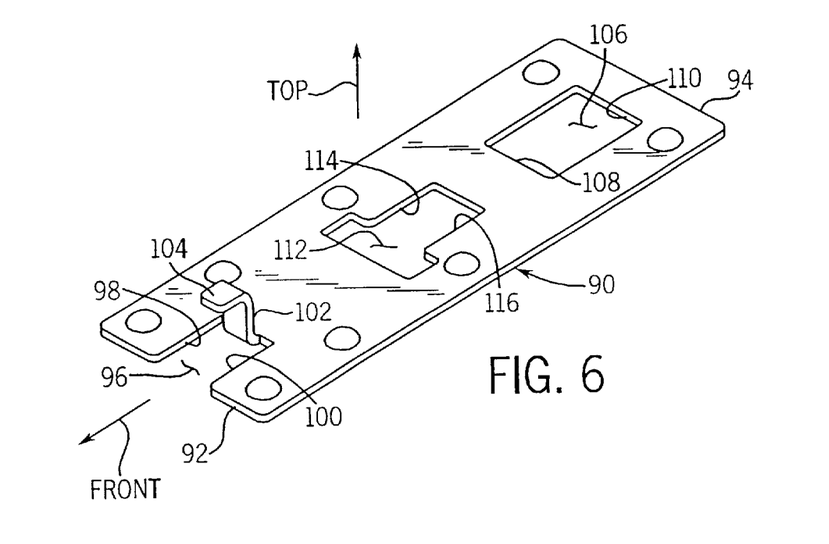
FIG. 6 is an enlarged scale top side perspective view of a slidable security latch member utilized in the docking station.

Still referring to FIG. 4, a rear end portion of the security latch plate 90 underlies the front tab portion 86 and is carried on the bottom side 118, for forward and rearward movement relative thereto, by generally L-shaped tabs 124 formed on the bottom side 118, extending downwardly through the latch plate openings 96 and 112, and slidably receiving the latch plate opening side edge portions 98,100 and 114,116 (see FIG. 6). The latch projection 102 projects upwardly through an opening 126 (see FIGS. 1 and 7) extending between the top and bottom sides 20,118 of the upper docking station housing section 18a and elongated in a front-to-rear direction.

The mechanism used to operatively couple the stationary notebook computer 14 to the docking station 12 also includes an elongated lever member 128 disposed on the bottom side 118 of the upper docking station housing section 18a as perspectively illustrated in FIG. 4. Lever member 128 has an inner end portion 128a pivotally connected, as at 130, to the upper housing section 18a adjacent its left side edge portion 26, and an outer end portion 128b that projects outwardly beyond a right side portion of the docking station housing 18. A drive pin 132 is suitably anchored to a longitudinally central portion of the lever 128 and extends upwardly therefrom into the slot 88 in the slide plate front tab portion 86 (see FIG. 5) and the rear end opening 106 of the security latch plate 90 (see FIG. 6).

Lever 128 is pivotable about its pivot location 130, as indicated by the double-ended arrow 134 in FIG. 4, between a forwardly pivoted docking position (see FIG. 3) in which the outer lever end 128b is moved to a forward limit position relative to the docking station housing 18, and a rearwardy pivoted undocking position (see FIG. 3A) in which the outer lever end 128b is moved to a rearward limit position relative to the docking station housing 18. Via the drive pin 132, forward pivoting of the lever 128 to its docking position correspondingly slides the latch plate 90, the slide plate 80 and the movable connector body 68 (see FIG. 3) forwardly to front limit positions thereof, and rearward pivoting of the lever 128 to its undocking position correspondingly slides the latch plate 90, the slide plate 80 and the movable connector body 68 (see FIG. 3A) to rear limit positions thereof.

To dock the notebook computer 14, the user grasps the outer lever end portion 128b and pushes it rearwardly to its FIG. 3A rear limit position, thereby rearwardly shifting the movable docking connector structure 72 relative to the housing 18 to its FIG. 3A undocking orientation. Computer 14 is then downwardly placed in the previously described receiving and holding area 66 (see FIG. 1) disposed on the top side of the docking station housing 18. This aligns the rear side computer connector socket 56 (see FIG. 3A) with the now rearwardly shifted connector plug 74 and associated guide pins 78.

Next, the user simply grasps the outwardly projecting outer lever end portion 128b and pulls it forwardly to its FIG. 3 docking position. This, in turn, forwardly drives the movable docking connector structure 72 relative to the stationary computer 14 to the FIG. 3 docking position of the connector structure 72 and causes the connector plug 74 to be forcibly and removably mated with the facing computer connector socket 56 (compare FIGS. 3 and 3A), with the guide pins 78 being received in corresponding guide openings (not shown) formed in the rear side of the computer adjacent opposite ends of the socket 56.

Figure 7:
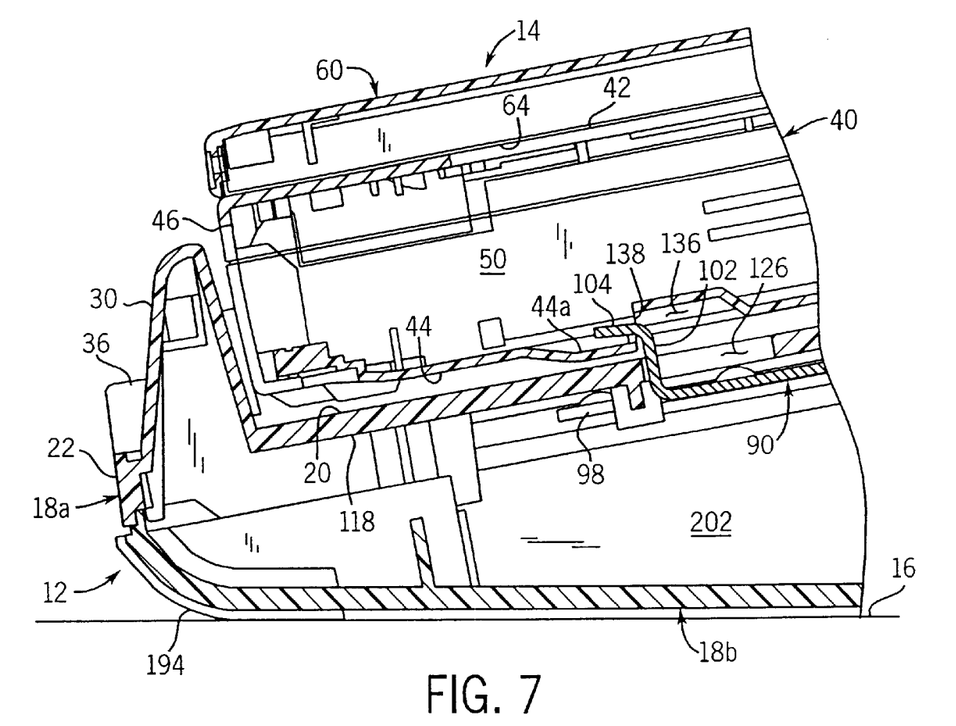
FIG. 7 is an enlarged scale partial cross-sectional view taken along line 7—7 through the portable computer and docking station shown in FIG. 2 and illustrating the operation of the slidable security latch member.

When the notebook computer 14 is initially placed in the receiving and holding area 66, with the lever 128 rearwardy pivoted to its undocking position, the latch hook 104 (see FIG. 7) which projects upwardly into the receiving and holding area 66 (see FIG. 1) upwardly enters a bottom side recess 136 formed in a front underside portion of the computer base housing 40 and extending rearwardly from a forwardly extending latching opening 138 (see FIG. 7) in the bottom side of the computer base housing 40. As the lever 128 is forwardly pivoted to effect the docking of the computer 14, the latch plate 90 is forwardly shifted to thereby cause the latch hook portion 104 to forwardly enter the computer underside latching opening 138 as shown in FIG. 7. In this forwardly shifted orientation of the latch plate 90, the hook 104 overlies a downwardly offset bottom base housing wall portion 44a to thereby prevent a front portion of the computer 14 from being lifted upwardly out of the receiving and holding area 66.

As illustrated in FIG. 3A, a small Kensington lock opening 140 is formed in the right side wall of the lower docking station housing section 18b adjacent the outer lever end 128b. When the outer lever end 128b is moved to its FIG. 3 docking position, a Kensington lock 144 may be inserted into the opening 140 and locked to the docking station 12. The attached lock 144 prevents the rearward movement of the outer lever end 128b from its FIG. 3 position. This, in turn, prevents the rearward undocking shifting of the movable docking connector structure 72 and the rearward shifting of the latch plate 90 from its FIG. 7 position. Accordingly, the in-place lock 144 prevents the removal of the docked notebook computer 14 from the docking station 12.

To undock the notebook computer 14, the lock 144 is simply removed, and the outer lever end 128a is pushed rearwardly from its FIG. 3 docking position to its FIG. 3A undocking position, thereby rearwardly uncoupling the movable connector plug 74 (see FIG. 3A) from the stationary computer connector socket 56, and also rearwardly shifting the latch plate 90 to rearwardly withdraw its hook portion 104 from the computer latching opening 138 (see FIG. 7) and permit the now undocked notebook computer 14 to be lifted out of the docking station top side receiving and holding area 66. While the mating docking connectors have been representatively illustrated as being a plug on the docking station and a socket on the computer, it will be readily appreciated that other types of mating electrical connectors could be alternatively utilized if desired.

The docking station 12 also includes an elevational adjustment member which is representatively in the form of an adjustment foot 146 that is pivotally secured to the docking station housing 18. Foot 146 is useable in a manner later described herein to adjust the front-to-rear tilt angle of the docking station 12 (and the notebook computer 14 docked thereto) relative to the horizontal support surface 16 among a series of varying tilt orientations including a generally horizontal minimum tilt orientation shown in FIG. 3 and a maximum tilt orientation shown in FIG. 8.

When the notebook computer 14 is operatively coupled to the docking station 12 as previously described, the resulting mating of the movable docking station connector 74 and the stationary computer connector 56 appropriately couples the schematically depicted computer circuitry 148 (see FIG. 3) to schematically depicted interface circuitry 150 operatively disposed within the interior of the docking station housing 18. As best illustrated in FIG. 9A, foot member 146 is of a hollow construction and has (as viewed in FIG. 9A) top and bottom sides 152 and 154, a hollow cylindrical front side portion 156, a rear side 158, and opposite left end right ends 160 and 162.

To facilitate the connection of various desktop peripheral devices to the docking station 12, and thus to the docked notebook computer 14, various connection ports are mounted on the support foot 146. These connection ports include (1) audio, microphone, headphone and DC power connection ports 164,166,168,170 carried on the left end of the support foot 146; (2) monitor, printer and serial ports 172,174,176 carried on the top side 152 of the support foot 146; and (3) mouse, keyboard, USB and RJ45 ports 178, 180,182,184 carried on the right end 162 of the support foot 146. These peripheral connection ports are operatively coupled to the docking station interface circuitry 150 by various leads 186 connected to the connection ports and extended through the interior of the support foot 146 to the interface circuitry 150.

Figure 8:
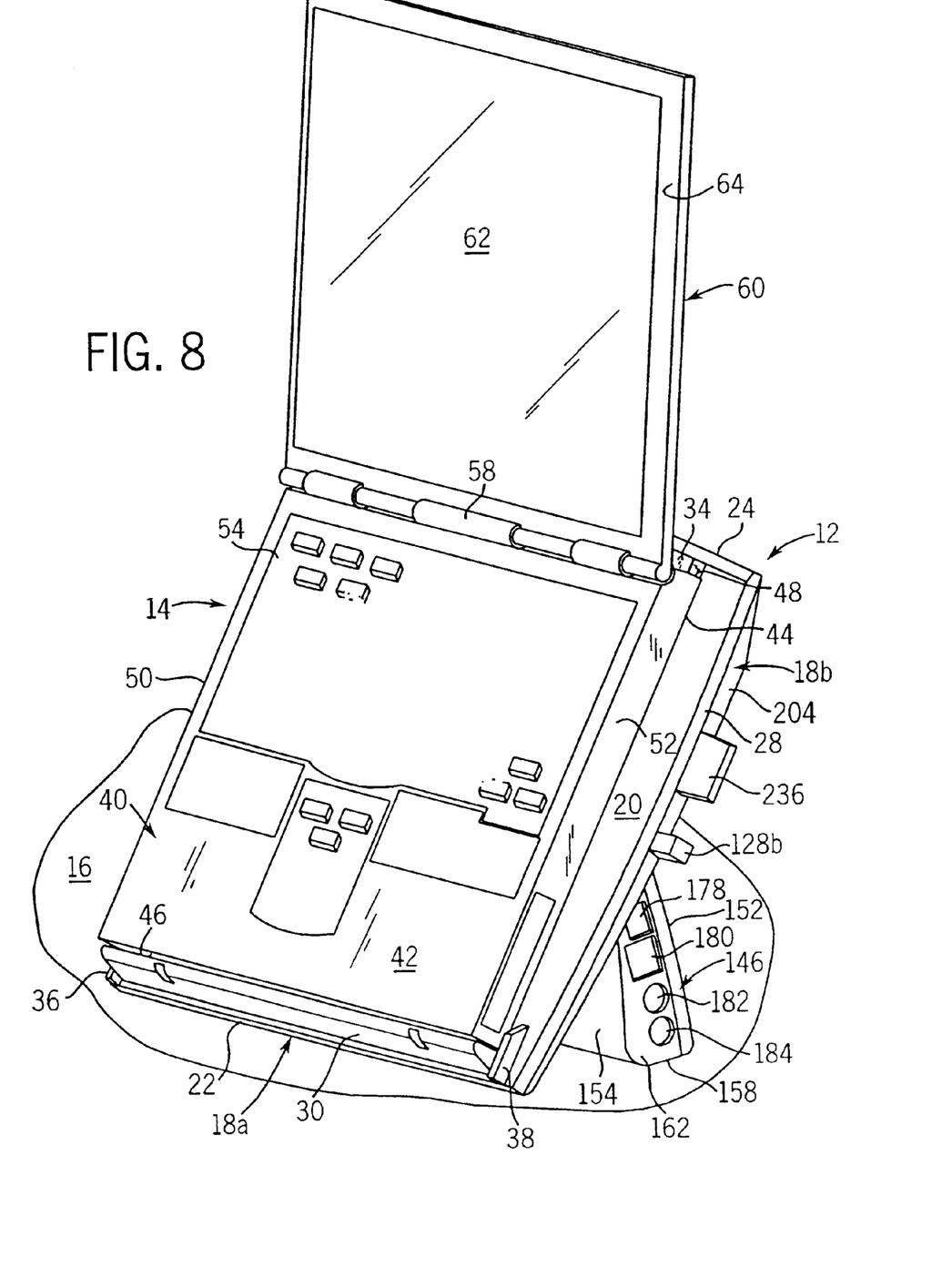
FIG. 8 is a view similar to that in FIG. 2, but with the docking station and the portable computer being in a pivotally raised orientation.
Figure 9:
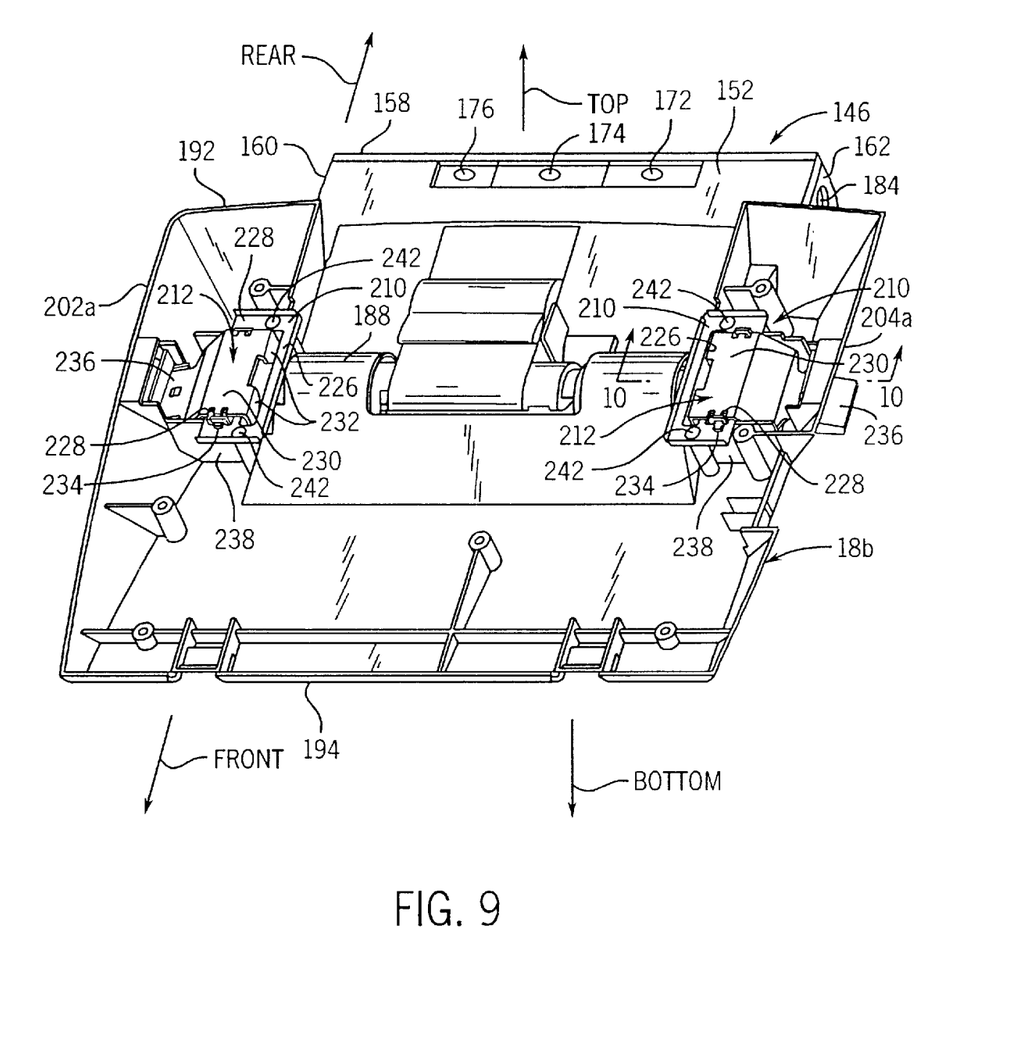
FIG. 9 is an enlarged scale top side perspective view of a bottom portion of the docking station removed from the balance thereof and illustrating an assembled, clutch-based pivotal elevation system incorporated in the docking station and embodying principles of the present invention.
Figure 9A:
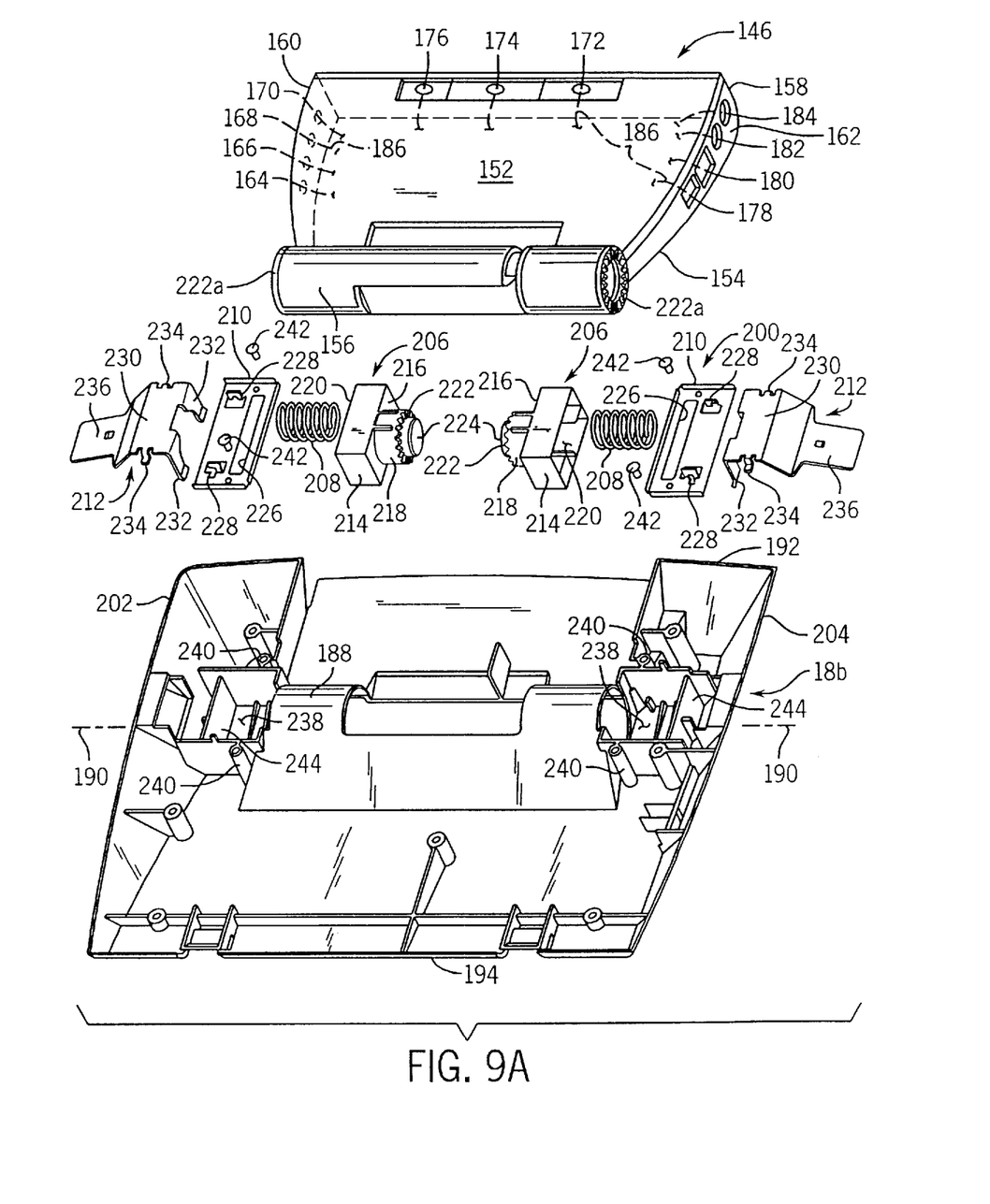
FIG. 9A is an exploded perspective view of the pivotal elevational system and the associated bottom portion of the docking station

Turning now to FIGS. 9 and 9A, the bottom docking station housing section 18b has an elongated, semicircularly cross-sectioned mounting portion 188 which is open on its bottom side and longitudinally extends along a horizontal axis 190 (see FIG. 9A) which is parallel to the rear side 192 of the bottom docking station housing section 18b and is forwardly offset from the rear side 192 approximately one third of the total distance between the rear side 192 and the front side 194 of the bottom docking station housing section 18b. A top side portion of the hollow cylindrical front side portion 156 of the support foot 146 is upwardly received in the mounting portion 188, and captively retained therein as later described herein, in a manner permitting the support foot 146 to pivot about the axis 190 relative to the docking station housing 18 between the support foot pivotal limit positions shown in FIGS. 3 and 8.

When the support foot 146 is in its FIG. 3 minimum pivotal limit position, the support foot side surface 154 contacts the desktop surface 16 in a manner causing the support foot 146 to prop the docking station 12 and docked notebook computer 14 up at a rearwardly and upwardly inclined tilt angle of approximately ten degrees relative to the desktop surface 16. When the support foot 146 is in its FIG. 8 maximum pivotal limit position, the support foot side surface 158 contacts the desktop surface 16 in a manner causing the support foot 146 to prop the docking station 12 and docked notebook computer 14 up at a rearwardy and upwardly inclined tilt angle of approximately 60 degrees relative to the desktop surface 16. In a manner later described herein, the support foot 146 may be releasably locked in these two pivotally adjusted positions, and in several other pivotally adjusted positions therebetween, to selectively vary the tilt angle of the docking station 12 and the notebook computer 14 docked thereto. This pivotal adjustment capability provides the docking station 12 with two primary advantages over conventional fixed orientation docking stations.

First, with the docked computer display housing 60 opened to a generally vertical orientation as illustrated in FIG. 8 and being used instead of a desktop monitor, the viewing height of the display screen 62 may be selectively varied (to suit users of varying heights) simply by pivotally adjusting the support foot 146 to correspondingly vary the tilt angle of the docking station 12. Due to the positioning of the foot pivot axis 190 (see FIG. 9A) forwardly of the rear side of the docking station housing approximately one third of the front-to-rear distance between the front and rear sides of the docking station housing, if the foot 146 is kept in stationary contact with the desktop surface 16 and the housing 18 is pivoted relative to the foot 146 to effect the housing tilt angle change, the vertical distance of the display screen 62 above the desktop surface 16 may be conveniently adjusted without substantially changing the horizontal distance between the user and the display screen 62. Second, when the display screen 62 is being utilized in lieu of a desktop computer monitor, the ability to pivot the docking station 12 upwardly substantially reduces the vertical footprint of the docking station/portable computer assembly 12,14 on the desktop work surface 16.

Figure 10:
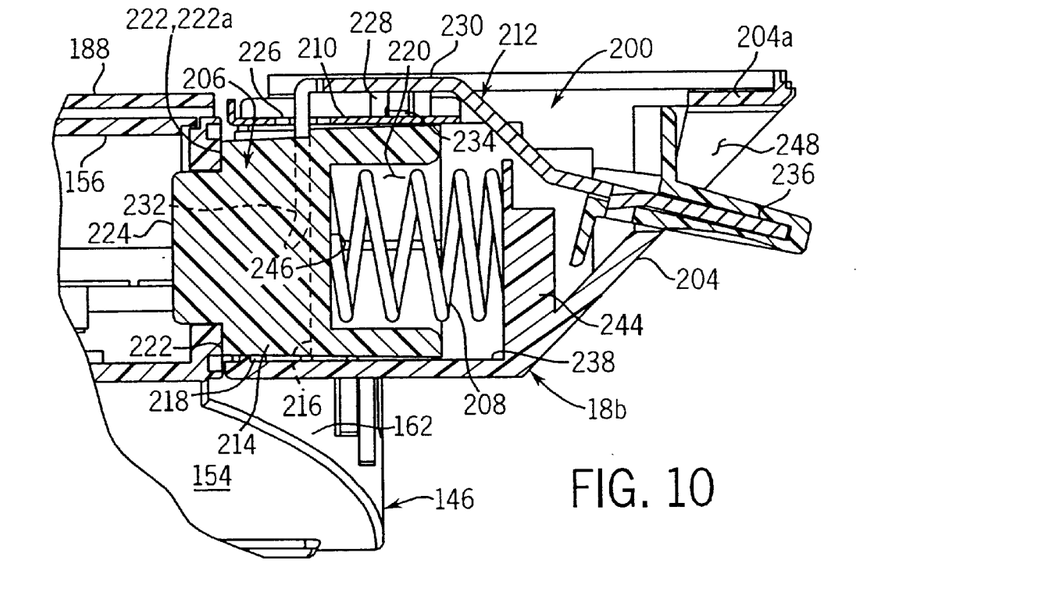
FIG. 10 is an enlarged scale cross-sectional view taken through a lower housing part of the docking station along line 10—10 of FIG. 9 and illustrating a portion of the spring-loaded clutch apparatus in the pivotal elevation system, with the clutch apparatus being in its operatively engaged orientation.
Figure 10A:
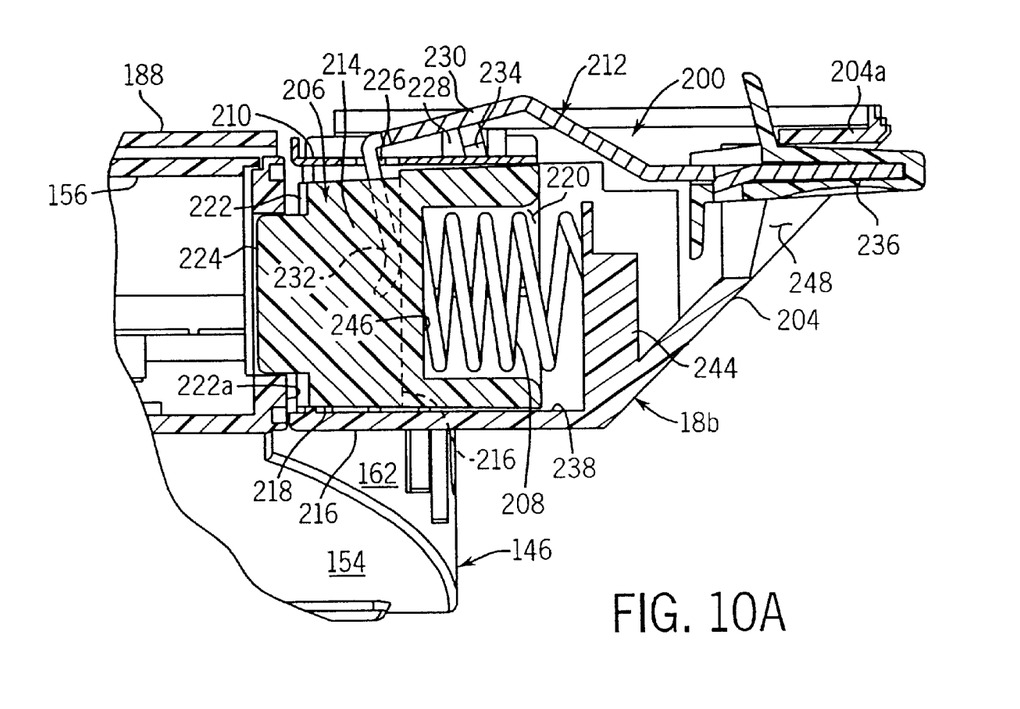
FIG. 10A is a view similar to that in FIG. 10, but with the clutch apparatus being manually moved to its disengaged orientation.

Turning now to FIGS. 9–10A, the pivotally adjustable support foot 146 is releasably lockable in any selected one of its various pivotal orientations relative to the docking station housing 18 by means of a specially designed clutch system 200 that includes, on each of the left and right side edge portions 202,204 of the bottom docking station housing section 18b, a clutch member 206, a cylindrical coiled compression spring 208, a retaining plate 210, and a drive lever plate member 212.

As best illustrated in FIG. 9A, each clutch member 206 has a rectangular body 214 with a front side 216 from which a cylindrical portion 218 outwardly projects, and a cavity 220 formed in its rear side. An annular array of clutch teeth 222 is disposed on the outer end of the cylindrical portion 218 and circumscribes a smaller diameter cylindrical mounting boss 224 projecting outwardly beyond the teeth 222. Each retaining plate 210 has an elongated slot 226 therein and a spaced apart pair of upstanding pivot support brackets 228. Each drive lever plate 212 has an inner end portion 230 from which a spaced pair of drive fingers 232 depend, a pair of pivotal support projections 234 disposed on opposite side edges of the inner end portion 230, and a downwardly offset outer end portion 236.

With reference now to FIGS. 9–10A, the opposite ends of the hollow cylindrical front side portion 156 of the support foot 146 have annular arrays of clutch teeth 222a which are complementarily configured relative to the clutch teeth 222 on the clutch members 206. The clutch members 206 are slidably received in open-topped well areas 238 formed in the bottom docking station housing section 18b adjacent its left and right side edge portions 202 and 204. Retaining plates 210 overlie the clutch members 206 and captively retain them in the wells 238, with the retaining plates 210 being removably secured to housing bosses 240 with screws 242. The clutch member cylindrical portions 218 face one another and project outwardly through the wells 238, with the bosses 224 being rotatable received in the opposite ends of the support foot cylindrical side portion 156 and the clutch teeth 222,222a being releasably mated with one another.

The compression springs 208 are also received in the wells 238 and bear at their opposite ends on outer well wall sections 244 and the inner side surfaces 246 of the clutch member body cavities 220, thereby resiliently biasing the clutch members 206 toward one another, resiliently holding the clutch teeth 222,22a in meshed engagement with one another, and resiliently holding the clutch member bosses 224 in the ends of the support foot side portion 156 to thereby captives and pivotally retain the foot member 146 on the docking station housing 18.

The drive lever inner end portions 230 overlie the retaining plates 210, with the drive lever support projections 234 being pivotally received in the retainer plate support brackets 228 and the drive fingers 232 extending downwardly through the retainer plate slots 226, straddling the cylindrical clutch portions 218, and bearing against the facing side surfaces 220 of the rectangular clutch member bodies 214. With the support foot member 146 adjusted to a desired pivotal position relative to the docking station housing 18, the clutch system 200 assumes its FIG. 10 position, with the outer drive lever end portions 236 extending outwardly through openings 248 in the opposite left and right side edge portions 202,204 of the bottom docking station housing section 18b and downwardly offset from upper lip sections 202a,204a of the side edge portions 202,204.

When it is desired to change the pivotal orientation of the support foot member 146 relative to the docking station housing 18, the user simply pinches the outwardly projecting lever portions 236 upwardly against the housing edge lip sections 202a,204a (see FIG. 10A). This pivots the levers 212 about their pivot projections 234 (compare FIG. 10A to FIG. 10) to thereby drive the clutch members 206 away from one another, compress the springs 208, and disengage the clutch member teeth 220 from the teeth 220a on the opposite ends of the support member side portion 156. This, in turn allows the foot member 146 and the docking station housing 18 to be pivotally adjusted relative to one another to another pivotal orientation at which time the user simply releases the lever ends 236 to permit the springs 208 to drive the clutch members 206 back toward one another, thereby re-engaging the clutch teeth 222 with the clutch teeth 222a and again releasably locking the support foot 146 against pivotal movement relative to the docking station housing 18.

Representatively, the support foot 146 is pivotally adjustable in twenty degree increments between its FIG. 3 minimum limit orientation and its FIG. 8 maximum limit orientation, thereby illustratively providing the docking station 12 and the docked notebook computer 14 with seven different available tilt angles. It will, of course, be readily appreciated that the docking station 12 could be provided with more or fewer available tilt orientations if desired, that a tilt adjustment member other than the pivotally mounted support member 146 could be used if desired, and a clutch system configured differently than the clutch system 200 could be utilized if desired.

It should also be noted that the configuration of the top side of the docking station 14 which, as previously described, holds the notebook computer 14 stationary while the docking station connector structure 72 is moved relative to the computer to effect docking and undocking, facilitates the docking and undocking of the computer even while the docking station is upwardly and rearwardly tilted at a substantial angle. For example, during docking, the front restraining rib 30 (see FIG. 8) braces the computer 14 to receive the docking force of the moving docking station connector structure 72 and also prevents gravity from subsequently causing an undocking movement of the upwardly and rearwardly tilted computer 14. Further, the rear restraining ribs 32 and 34 (see FIG. 1) brace the computer 14 against the rearward undocking force created thereon during rearward movement of the docking station connector structure 72 relative to the computer.

The foregoing detailed description is to be clearly understood as being given by way of illustration and example only, the spirit and scope of the present invention being limited solely by the appended claims.

What is claimed is:

1. A docking station for use in operatively coupling a portable computer to a desktop computer peripheral device, the portable computer having a base structure, a display movably coupled to the base structure via a joint structure, and a first electrical docking connector disposed in the base housing, said docking station comprising:

a housing having a wall portion upon which the base structure may be placed, such that the joint structure is operable to facilitate movement of the display to a desired viewing orientation relative to the base structure, said housing being restable on a horizontal support surface;

a second electrical docking connector carried by said housing and being releasably mateable with the first electrical docking connector; and a tilt adjustment structure carried by said housing and being operative to selectively adjust the angle between said wall portion and the horizontal support surface when said housing is placed thereon, said tilt adjustment structure including:

a support member associated with said housing for movement relative thereto among a series of different positions and being engageable with the horizontal support surface, and a locking structure operable to releasably lock said support member in a selectively variable one of said series of different positions, said locking structure having a lever portion movable against said housing to disengage a selective engagement of intermeshed arrays of teeth disposed on, and between, said locking structure and a portion of said support member.

2. The docking station of claim 1 wherein:

said support member is a support foot member pivotally carried on an underside portion of said housing.

3. The docking station of claim 2 wherein:

said housing has opposite, generally parallel front and rear sides, and said support foot member is pivotal relative to said housing about an axis substantially parallel to said rear side.

4. The docking station of claim 3 wherein:

said axis is forwardly spaced apart from said rear side approximately one third of the distance between said front and rear sides.

5. The docking station of claim 1 wherein:

said locking structure is a spring-loaded clutch structure selectively engageable with a portion of said support member.

6. The docking station of claim 5 wherein:

said spring-loaded clutch structure has a lever portion squeezable against said housing to temporarily disengage said spring-loaded clutch structure from said portion of said support member.

7. A docking station for use in operatively coupling a portable computer to a desktop computer peripheral device, the portable computer having a first electrical docking connector disposed in the base housing, said docking station comprising:

a housing having a wall portion upon which the portable computer may be placed, said housing being restable on a horizontal support surface;

a second electrical docking connector carried by said housing and being releasably mateable with the first electrical docking connector; and a tilt adjustment structure carried by said housing and being operative to selectively adjust the angle between said wall portion and the horizontal support surface when said housing is placed thereon, said tilt adjustment structure including:

a support member associated with said housing for movement relative thereto among a series of different positions and being engageable with the horizontal support surface, and a spring-loaded clutch structure operable to releasably lock said support member in a selectively variable one of said series of different positions, wherein said spring-loaded clutch structure has a lever portion squeezable against said housing to temporarily disengage a selective engagement of intermeshed arrays of teeth disposed on, and between, said spring-loaded clutch structure and a portion of said support member.

8. The docking station of claim 1 wherein:

said locking structure movably carries said support member.

9. The docking station of claim 1 further comprising:

electrical interface circuitry coupled to said second electrical docking connector, and at least one connection port coupled to said electrical interface circuitry and to which a desktop peripheral device may be electrically connected.

10. The docking station of claim 9 wherein:

said at least one connection port is carried by said support member.

11. The docking station of claim 1 wherein:

said support member is pivotally carried on said housing and is releasably lockable in (1) a first pivotal limit position thereof to engage the horizontal support surface in a manner tilting said wall portion at an angle of approximately ten degrees relative to the horizontal support surface, and (2) a second pivotal limit position thereof to engage the horizontal support surface in a manner tilting said wall portion at an angle of approximately 60 degrees relative to the horizontal support surface.

12. The docking station of claim 11 wherein:

said support member is additionally releasably lockable at approximately twenty degree pivotal increments between said first and second pivotal limit positions thereof.

13. A docking station for use in operatively coupling a portable computer to a desktop computer peripheral. device, the portable computer having a base structure, a display movably coupled to the base structure via a joint structure, and a first electrical docking connector disposed in the base housing, said docking station comprising:

a housing having a wall portion upon which the base structure may be placed, such that the joint structure is operable to facilitate movement of the display to a desired viewing orientation relative to the base structure, said housing being restable on a horizontal support surface;

a second electrical docking connector carried by said housing and being releasably mateable with the first electrical docking connector; and a tilt adjustment structure carried by said housing and being operative to selectively adjust the angle between said wall portion and the horizontal support surface when said housing is placed thereon, said tilt adjustment structure including:

a support foot member carried by said housing and being pivotable relative to said housing among a series of different pivotal orientations and being engageable with the horizontal support surface in said series of different pivotal orientations to variably prop up said housing thereon, and a manually operable clutch system for selectively engaging a portion of said support foot member and releasably locking said support foot member in a selectively variable one of said series of pivotal orientations, said manually operable clutch system having an actuator to temporarily disengage a selective engagement of intermeshed arrays of teeth disposed on, and between, said manually operable clutch system and a portion of said support member.

14. The docking station of claim 13 wherein:

said support foot member is pivotally carried on an underside portion of said housing.

15. The docking station of claim 14 wherein:

said support foot member is pivotally carried by said manually operable clutch system.

16. The docking station of claim 14 wherein:

said housing has opposite, generally parallel front and rear sides, and said support foot member is pivotal relative to said housing about an axis substantially parallel to said rear side.

17. The docking station of claim 16 wherein:

said axis is forwardly spaced apart from said rear side approximately one third of the distance between said front and rear sides.

18. The docking station of claim 13 further comprising:

electrical interface circuitry coupled to said second electrical docking connector, and at least one connection port coupled to said electrical interface circuitry and to which a desktop peripheral device may be electrically connected.

19. The docking station of claim 18 wherein:

said at least one connection port is carried by said support foot member.

20. The docking station of claim 13 wherein:

said support foot member is releasably lockable by said clutch system in (1) a first pivotal limit position thereof to engage the horizontal support surface in a manner tilting said wall portion at an angle of approximately en degrees relative to the horizontal support surface, and (2) a second pivotal limit position thereof to engage the horizontal support surface in a manner tilting said wall portion at an angle of approximately 60 degrees relative to the horizontal support surface.

21. The docking station of claim 20 wherein:

said support foot member is additionally releasably lockable by said clutch system at approximately twenty degree pivotal increments between said first and second pivotal limit positions thereof.

22. A docking station for use in operatively coupling a portable computer to a desktop computer peripheral device, the portable computer having a first electrical docking connector disposed in the base housing, said docking station comprising:

a housing having a wall portion upon which the portable computer may be placed, said housing being restable on a horizontal support surface;

a second electrical docking connector carried by said housing and being releasably mateable with the first electrical docking connector; and a tilt adjustment structure carried by said housing and being operative to selectively adjust the angle between said wall portion and the horizontal support surface when said housing is placed thereon, said tilt adjustment structure including:

a support foot member carried by said housing and being pivotable relative to said housing among a series of different pivotal orientations and being engageable with the horizontal support surface in said series of different pivotal orientations to variably prop up said housing thereon, said support foot member having spaced apart first series of clutch teeth thereon; and a manually operable clutch system for selectively engaging a portion of said support foot member and releasably locking said support foot member in a selectively variable one of said series of pivotal orientations, said clutch system including:

first and second opposed clutch members carried by said housing for movement toward and away from one another and having second series of clutch teeth thereon which oppose said first series of clutch teeth, spring structures resiliently biasing said first and second clutch members toward one another to positions in which said second series of clutch teeth are lockingly intermeshed with said first series of clutch teeth, and manually operable force exerting members associated with said clutch members and useable to move them away from one another against the biasing forces of said spring structures.

23. The docking station of claim 22 wherein:

said force exerting members are lever members pivotally associated with said housing and drivingly engageable with said clutch members.

24. The docking station of claim 23 wherein:

said lever members have outer end portions that project outwardly from said housing and may be manually squeezed against adjacent portions of said housing to drive said clutch members away from one another to temporarily disengage said second series of clutch teeth from said first series of clutch teeth and thereby unlock said support foot member from said clutch system.

* * * * *